United States Patent [19]
Müller

[11] 3,709,275
[45] Jan. 9, 1973

[54] WEB LINK FOR TIRE CHAINS
[75] Inventor: Anton Müller, Unterkochen, Germany
[73] Assignee: Pistor-Kette GmbH, Wuppertal-Cronenberg, Germany
[22] Filed: Sept. 28, 1970
[21] Appl. No.: 75,926

[30] Foreign Application Priority Data

Sept. 26, 1969 Germany.....................P 19 48 717.3

[52] U.S. Cl................................................152/243
[51] Int. Cl..............................................B60c 27/04
[58] Field of Search......................................152/243

[56] References Cited

UNITED STATES PATENTS 1,469,105  9/1923  Parent................................152/243

FOREIGN PATENTS OR APPLICATIONS 551,466  12/1959  Belgium..............................152/243

Primary Examiner—James B. Marbert
Attorney—Walter Becker

[57] ABSTRACT

A web link for antiskid tire chains which has a web on the tire side and a web on the road side. The web on the road side has lateral extensions which increase the running surface of the link and stabilize the link in operation. The extensions are preferably midway along the link and recesses may be provided on each side of the extensions to improve the traction of the link.

14 Claims, 14 Drawing Figures

PATENTED JAN 9 1973

Inventor:
Anton Müller

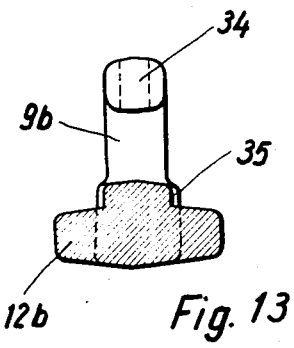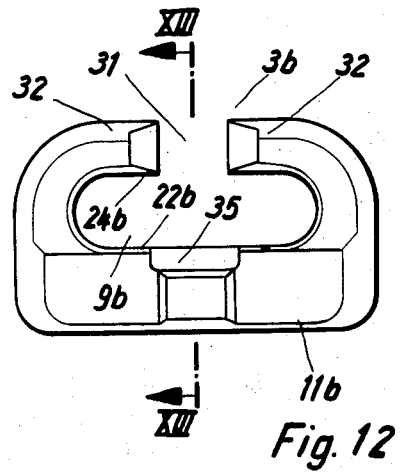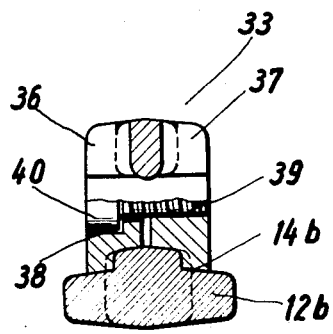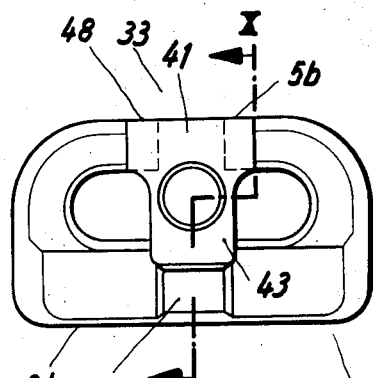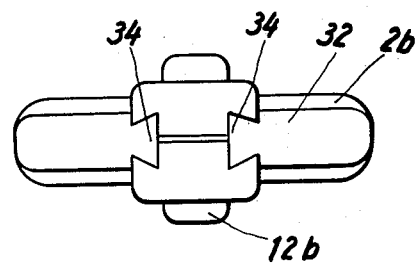

WEB LINK FOR TIRE CHAINS

The present invention relates to a web link for antiskid chains for tires with at least one receiving opening for a connecting link, which opening is provided between an engaging web forming a tire engaging surface and a running web forming the oppositely located running surface.

It is an object of the present invention to provide a web link of the above mentioned general type which while being simple in construction and having a low weight will in spite of wear have a relatively long life and a highly satisfactory grip.

This object and other objects and advantages of the invention will appear more clearly from the following specification in connection with the accompanying drawings, in which:

FIG. 5 represents a side view of the modified web link while FIG. 6 is a section taken along the line VI—VI of FIG. 5; FIG. 7 is a bottom view of the link of FIG. 5 and FIG. 8 is a section taken along the line VIII—VIII of FIG. 5.

FIG. 9 is a side view of still another embodiment of a web link according to the invention.

FIG. 10 is a section taken along the line X—X of FIG. 9.

FIG. 11 is a top view of the web link of FIG. 9.

FIG. 12 shows the web link of FIG. 9 without closing member.

FIG. 13 is a section taken along the line XIII—XIII of FIG. 12.

Figure 4:
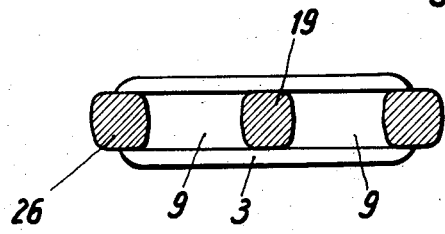
FIG. 4 is a section taken along the line IV—IV of FIG. 1.
Figure 3:
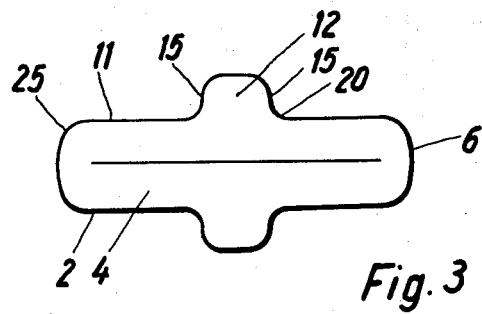
FIG. 3 shows a bottom view of the web link of FIG. 1.

The web link according to the present invention is characterized primarily in that at least one side of the web link is provided with at least one laterally protruding extension forming a part of the running surface. A particularly low weight of the link will be obtained when the extension is located exclusively within the range of the running web so that the extension with each condition of wear of the web link will have the same cross-sectional height as the web link, and after the web link has completely worn also the link will have worn completely.

For purposes of obtaining uniform conditions in both driving directions, the extension or extensions are arranged symmetrically with regard to the center of the length of the running web.

According to a particularly simple embodiment of the invention, the extension when viewed from the side has a substantially rectangular, for instance, square contour.

For purposes of further reducing the weight of the web link and stabilizing the same during the operation, the extension tapers towards its free end, preferably by an inclined design of all four circumferential surfaces.

In order to prevent the accumulation of dirt in the corners between the extension and the lateral surfaces of the web link, that circumferential surface of the extension which faces away from the running surface merges through a convexly rounded portion with the lateral surface of the web link.

According to a preferred embodiment of the invention, the extension extends in the longitudinal direction of the web by a distance equalling approximately from one fourth to one fifth of the length of the running web whereby particularly favorable conditions are obtained. This ratio may be realized advantageously, for instance, also when the distance over which the extension extends in the longitudinal direction of the web with a web link having two adjacent, for instance, oblong receiving openings, corresponds to the free distance between said openings so that the pressing forces acting upon the extension are introduced into the transverse web between the receiving openings.

Highly satisfactory running conditions of the web link and a reduced wear are realized when the extension extends transverse to the central plane of the web link by about half the thickness thereof. In particular, when employing the web link according to the invention at the running portion of the tire antiskid chain, it is expedient to provide both sides of the running web with extensions so that a tilting of the web link can easily be avoided and that the central plane of the web link will be approximately perpendicular to an engaging surface of the tire.

A further increase in the grip of the web link while at the same time reducing the weight thereof will be realized by providing at least one depression in the running web at the running surface, preferably directly adjacent to the extension. The effect of this depression is particularly favorable when the depression extends to both lateral surfaces of the web link. Expediently, on both sides of the extension there is respectively provided a depression so that uniform conditions will be obtained in both running directions.

According to a further development of the invention, the depth of the depression is less than half the height of the running web so that after the running web has worn down to the bottom surface of the depressions, no depressions will exist any longer and the wearing surface is considerably increased. While under such circumstances the gripping effect of the depressions no longer prevails, it will be evident that in view of the relatively low height of the web link, especially in yielding ground, already surface of the tire will become effective so that no considerable decrease in the gripping effect will occur so that the lateral extensions of the running web will be effective as before.

In order to assure a relatively high rigidity of the web link, the extension of the depression in the longitudinal direction of the running web is less than the corresponding distance over which the extension extends. For purposes of assuring a self-cleaning effect, the lateral walls of the depression flare in the direction toward the running surface.

Referring now to the drawings in detail and FIGS. 1 to 4 thereof in particular, the web link 1 illustrated therein has a running web 2 extending in the longitudinal direction of link 1 and also has an engaging web 3 substantially parallel to the running web 2, while the webs 2 and 3 form the longitudinal edge surfaces 4 and 5 of the web link 1. The longitudinal edge surface 4 of the running web 2 merges through rounded portions 7 forming approximately a quarter of a circle with the end face edge surfaces 6 of the web link. The radius of the rounded portions 7 corresponds approximately to one sixth of the height of the web link 1, i.e., of the distance between the longitudinal edge surfaces 4, 5. The longitudinal edge surface 5 merges through rounded portions 8 which extend approximately over a quarter of a circle with the end face edge surfaces 6. The rounded portions 8 have a radius which corresponds approximately to half the height of the web link 1.

Between the webs 2, 3 and symmetrically arranged with regard to the transverse central plane of the web link 1, the latter is provided with two oblong receiving openings 9. The central axes of said openings 9 which axes are parallel to the longitudinal surfaces 4, 5 are spaced from the longitudinal edge surface 5 by a distance which corresponds approximately to the radius of the rounded portions 8. This distance is less than the distance between the central axes of the receiving openings 9 and the longitudinal edge surface 4 so that the running web 2 will have a greater cross-sectional height than the engaging web 3. The free distance between the two receiving openings 9 corresponds approximately to one sixth of the length of the web link 1.

Figures 1, 2:
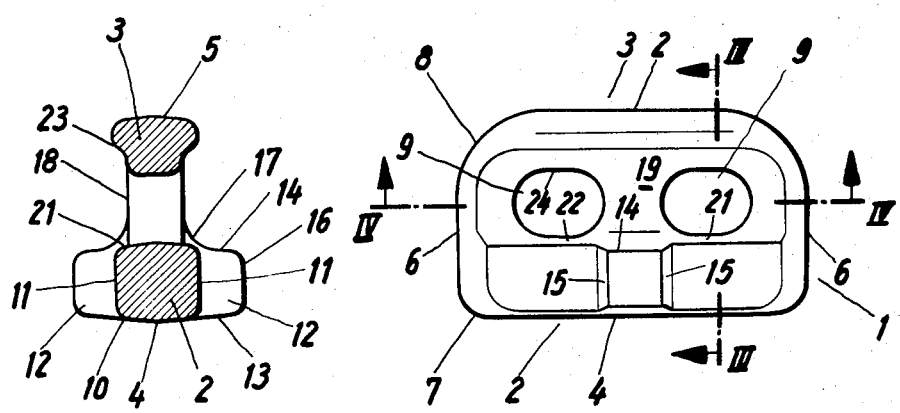
FIG. 1 is a side view of a web link according to the present invention.
FIG. 2 represents a section taken along the line II—II of FIG. 1.
Figure 6:
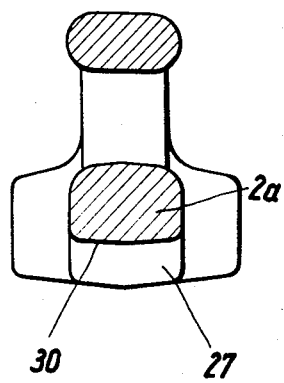
FIGS. 5 to 8 illustrate a further embodiment of a web link according to the invention and, more specifically.
Figure 5:
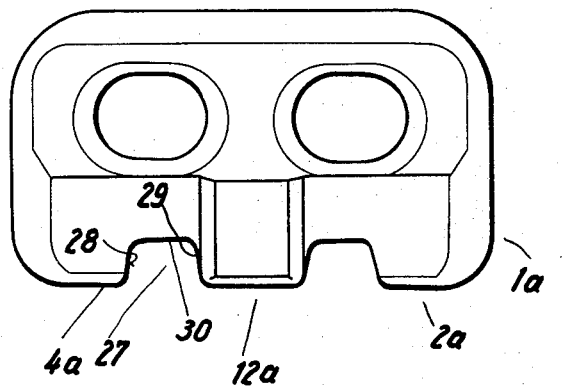

The longitudinal edge surface of the running web 2 which web 2 is in conformity with FIG. 2 of approximately square cross-section forms the running surface 4 of the web link 1 while the running surface 4 is formed by two plane individual surfaces 10 which are symmetrical to the longitudinal central plane of the web link 1 and in a roof-shaped manner form with each other an obtuse angle of approximately 168°. The individual plane surfaces 10 intersect in the central plane of the web link 1.

Each lateral surface 11 of the running web 2 has the central portion of the length of the web link 1 provided with an extension 12 which laterally protrudes beyond this lateral surface. The extension 12 when viewing the end surface has a trapezoidal contour and in side view according to FIG. 1 is of an approximately square configuration. The four circumferential surfaces 13 – 15 which are located at a substantially right angle with regard to each other slightly taper toward the end surface 16 so that each extension 12 tapers to its free end 16. The end faces 16 are substantially parallel to the longitudinal central plane of the web 1.

That outer circumferential surface 13 of each extension 12 which faces away from the engaging web 3 is located in the plane of the pertaining individual surface 10 of the longitudinal edge surface 4 formed by the running web 2 so that the circumferential surfaces 13 likewise form running surfaces. The extensions 12 substantially extend exclusively only over the cross-sectional height of the running web 2 while the circumferential surfaces 14 which face away from the running surface 4 merge through concave rounded portions 17 extending approximately over a quarter of a circle, with the lateral surfaces 18 of that section of web 1 which comprises the receiving openings 9. The radius of the rounded portions 17 corresponds approximately to one half the distance between the circumferential surfaces 13 and 14. The extensions 12 which are symmetrical with regard to the longitudinal central plane of the web link 1 and also with regard to its transverse central plane extend in the longitudinal direction of the web link 1 and, more specifically, when measured at the end faces 16 of link 1, by a distance which corresponds approximately to the free distance between the receiving openings 9. Consequently, the pressing force which when employing the web link 1 acts upon the extensions 12 is introduced into the transverse central web 19 which separates the two receiving openings 9 from each other.

The two lateral surfaces 15 of each extension 12 which taper at an angle of approximately 12° merge through rounded portions 20 which extend approximately over a quarter of a circle, with the lateral surfaces 11 of the running web. All circumferential surfaces 13 – 15 merge through rounded portions with the end surface 16 of the pertaining extension 12. Each extension 12 extends perpendicularly to the longitudinal central plane of the web link 1 by a distance which corresponds approximately to half the cross-sectional width of the running web 2 measured in the same direction so that the width or thickness of the running web 2 within the region of the extensions 12 is approximately twice as great as it is in the remaining area while the distance between the end faces 16 of the two extensions 12 corresponds approximately to half the length of the web link 1.

The lateral surfaces 11 of the running web 2 which are substantially parallel to each other merge through slightly rounded shoulder surfaces 21 which are approximately perpendicular to the longitudinal central plane of the web link 1, with the lateral surfaces 18. These shoulder surfaces 21 form within the region of the receiving opening 9 the inner surfaces 22 of opening 9 which extend in the longitudinal direction of the web. As a result thereof, the running web intended for wear will laterally protrude beyond the lateral surfaces of the remaining web link so that on one hand a large wear cross-section is obtained and on the other hand a low weight will be assured.

Between the running web 2 and the engaging web 3, in other words within the region of the receiving openings 9, the web link 1 has a thickness which approximately equals two third of the cross-sectional width of the running web 2. The engaging web 3 is in the region thereof which faces the receiving openings 9 of a thickness which corresponds to the distance between the two lateral surfaces 18.

Within the region of its longitudinal edge surface which forms the tire engaging surface 5 of the web link 1, the engaging web is, however, somewhat widened while the engaging web 3 in this region has a cross-sectional width corresponding to the cross-sectional width of the running web 2. The lateral surfaces 23 of the engaging web 3 are in the cross-section according to FIG. 2 curved approximately in an S-shape so that sharp edges are completely avoided. The inner surfaces 24 of the engaging web 3, however, which form longitudinal surfaces 24 pertaining to the receiving openings 9 and facing toward the tire engaging surface 5 merge through slightly rounded portions with the lateral surfaces 23 of the engaging web 3. Also the edges of the semicircular end sections of the receiving openings 9 are provided with corresponding short radii so that their outer edges are relatively sharp.

The lateral surfaces 11, 18, 23 of the web link 1 merge with the end faces 6 thereof through rounded portions extending approximately over a quarter of a circle. The radius of these rounded portions corresponds approximately to one third of the cross-sectional width of the running web 2. The outer transverse webs 26 have approximately square-shaped cross-sections in conformity with the central transverse web 19.

The web member which in conformity with the present invention may be designed as a forged member, has a very high wear volume at the running web 2 and a very effective grip, especially with regard to clay ground or smooth snow-covered or icy surfaces, while the weight of said web member is relatively low. The relatively wide tire engaging surface 5 will assure that the web member, for instance, when employed on quartz containing ground, such as sand or other wet aggressive ground, will have a long life. Furthermore, the tire will be saved greatly by the web member according to the invention. The web member according to the invention may be used for any possible configuration of an antiskid chain for tires.

Figure 7:
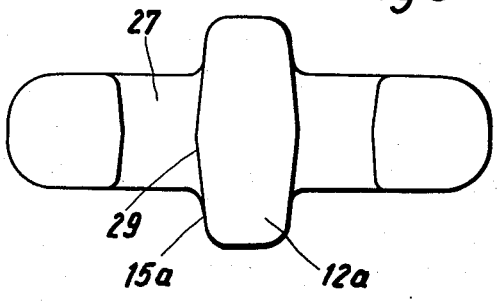
Figure 8:
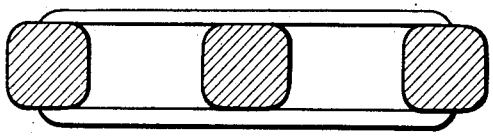
Figure 14:
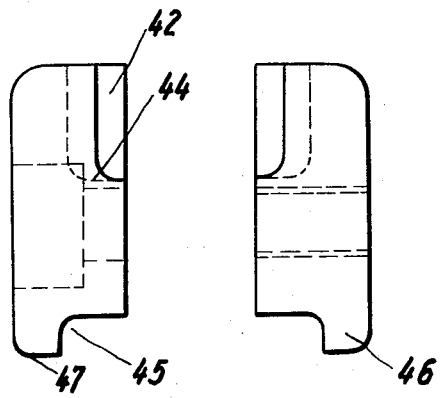
FIG. 14 is a view of two closing 10. of the closing member shown in FIGS. 9 and 10.

The web link 1a according to FIGS. 5 to 8 has its running web 2a in the longitudinal direction of the web link 1a and on both sides of the extensions 12a provided with a depression 27 each. Each depression 27 extends in the longitudinal direction of the web link 1a over a maximum distance approximately equaling one sixth of the length of the web link 1a so that the extension of each groove-shaped depression or recess 27 in the longitudinal direction of the web link 1a is less than the corresponding distance over which the extensions 12a extend. The lateral walls 28, 29 of each recess 27 taper at an acute angle of approximately 20° in the direction toward the bottom of the cavity 30. The bottom 30 of each recess 27 is substantially parallel to the longitudinal direction of the link 1a. The depth of the recesses 27 corresponds approximately to one third of the cross-sectional height of the running web 2a. Those lateral surfaces 29 of the recesses 27 which face the extensions 12a merge directly with the lateral circumferential surfaces 15a of the extensions 12a so that the web member when viewed from the bottom according to FIG. 7 is cross-shaped. In view of the recesses 27, the running surface 4a which may, for instance, be casehardened, is considerably increased so that an increase in the life of the web member as well as a reduction in its weight will be obtained.

The principle of the present invention may also be applied to a connecting link, such as a double hook, illustrated in FIGS. 11 to 13. This connecting link 1b has an oblong receiving opening 9b. The engaging web 3b is provided with an insert opening 31 which is located symmetrically with regard to the center of the length of the connecting link 1b so that two web legs 32 are formed which in the manner of two cantilevers are directed toward each other. The connecting links can be introduced into the receiving openings 9b through the insert opening 31. Thereupon the insert opening is closed by a closing member 33.

The two ends of the web legs 32 are of a dovetailshaped design 34 the common central plane of which is located in the longitudinal central plane of the connecting link 1b. The extensions 12b at the lateral surfaces of the web member 2b which extend all the way through in contrast to the engaging web 3b, do with this embodiment not extend over the entire cross-sectional height of the running web 2b but extend only over approximately two third of this cross-sectional height. As a result thereof, that side of each extension 12b which faces toward the receiving opening 9b may at the pertaining lateral surfaces 11b of the running web 2b be provided with a groove-shaped recess 35. The width of recess 35 is slightly greater than the corresponding distance over which the extension 12b extends, said last mentioned width extending from the pertaining extension 12b to the inner surface 22b of the receiving opening 9b.

The closing member 33 comprises two jaws 36, 37 formed by separate parts. The dividing plane for the jaws 36, 37 is located symmetrically with regard to the longitudinal central plane of the connecting link 1b. The two jaws 36, 37 have a substantially identical outer shape and differ from each other merely in that one jaw 36 has a counter-sunk bore 38 for a clamping screw 40, whereas the other jaw 37 is provided with an inner threaded bore 39 for the screw 40. Each jaw 36, 37 when viewed from the side according to FIG. 9 has a T-shaped contour while at the ends of the T-transverse webs 41 openings 42 are provided which correspond to the dovetails 34. The dovetail openings 42 extend only over half the height of the T-transverse webs 41 so that in the merging area with the T-foot web 43 toward the end face abutment surfaces 44 are formed which engage the inner surfaces 24b of the web legs 32 or dovetails 34. The webs 43 of the two jaws 36, 37 are within the region of their free ends and, more specifically, at the inner surfaces facing each other provided with angle-shaped recesses 45 in such a way that they extend around the running web 2b not only laterally but also at the inner sides thereof which means at the inner surface 22b of the receiving opening 9b. The protruding ends 46 of the T-shaped foot webs 43 of the jaws 36, 37 correspond as to shape to the grooves 35 and positively engage the same. The end faces 47 engage the circumferential surfaces 14b which pertain to the extensions 12b and are directed toward the receiving opening 9b. As a result thereof, the closing member 33 is very reliably held on the connecting link 1b while the webs 43 divide the receiving opening 9b into two substantially uniform individual openings. Inasmuch as the lateral surfaces of the running web 2b are provided with the extensions 12b, the closing member 33 according to FIG. 10 may perpendicularly to its dividing plane have a relatively great extension while, however, the extensions 12b laterally protrude beyond the jaws 36, 37 of the closing member 33. In view of the relatively great width of the closing member 33, a safe mounting of screw 40 will be assured. Screw 40 is located between the inner surfaces 22b, 24b of the receiving opening 9b while the diameter of the threaded portion of screw 40 is less than the width of the insert opening 31.

The two jaws 36, 37 are by means of the clamping screw 40 clamped against the lateral surfaces of the dovetails 34 and against the bottom surfaces of grooves 35. In view of the inclined circumferential surfaces 14b, simultaneously a clamping of the closing member 33 parallel to the longitudinal central plane of the connecting member 1b is effected between its two longitudinal webs 2b, 3b. The outer longitudinal surfaces 48 of the T-traverse webs 41 of jaws 36, 37 are located in the tire engaging surface 5b of the engaging web 3b so that they form a widened portion of this tire engaging surface.

In view of the relatively sharp edge design of the outer edges of the receiving openings 9 in the embodiment according to FIGS. 1 to 4, it will be assured that the web member can tilt only slightly. Therefore, in cooperation with corresponding connecting links, a semi-rigid system is obtained which means a chain configuration with which the individual members can tilt toward each other to a rather limited extent only.

It is, of course, to be understood that the present invention is, by no means, limited to the particular showing in the drawings but also comprises any modifications within the scope of the appended claims.

What is claimed is:

1. A web link for antiskid chains for tires and having a web-formed link body in which there is at least one receiving opening transverse to web plane location, said link body being generally rectangular when viewed from the side with a first longer web means engagable on the side adjacent the tire on which the chain is mounted and a second longer web means on the opposite side and shorter end web means interconnecting the ends of said longer web means, said second web means having an outer side facing away from the tire and forming the running surface of the link, and extension means on said second longer web means in the form of at least one extension protruding directly laterally from said second web means and having an outer side forming an additional portion of said running surface of the link transversely over essentially entire cross-sectional wear height of said second longer web means.

2. A link according to claim 1 in which said extension when viewed from the side of the link is substantially square and is located substantially midway along said second web means and is disposed within the limits of said second web means when viewed from the side of the link.

3. A link according to claim 2 in which said extension tapers inwardly on all sides in a direction away from said link.

4. A link according to claim 2 in which that side of said extension which faces said first longer side is joined to the adjacent lateral surface of the link by a fillet.

5. A link according to claim 2 in which said extension extends longitudinally of the link a distance equal to about one-fifth to one-sixth of the length of the link and protrudes laterally from the plane of the adjacent lateral surface of the link a distance about equal to half the lateral thickness of said second web means.

6. A link according to claim 2 in which said extension extends substantially to the receiving opening for the full height of said second web means.

7. A link according to claim 1 in which said first web means has an opening therein for the introduction of other chain links therein, a closure member detachably mounted in said opening, said extension being aligned with said opening and terminating short of the upper limit of said second web means, and groove means in said second web means above the upper end of said extension for engagement by said closure member.

8. A link for a tire chain, said link being generally rectangular when viewed from the side with a first longer web means on the side adjacent the tire on which the chain is mounted and a second longer web means on the opposite side and shorter end web means interconnecting the the ends of said longer web means, said second web means having an outer side facing away from the tire and forming the running surface of the link, and extension means on said second longer web means in the form of at least one extension protruding laterally from said second web means and having an outer side forming a portion of said running surface of the link, said first web means having an opening therein for the introduction of other chain links therein, a closure member detachably mounted in said opening, said extension being aligned with said opening and terminating short of the upper limit of said second web means, and groove means in said second web means above the upper end of said extension for engagement by said closure member, that end of the closure member adjacent the tire being wider than said first web means whereas the other end of the closure member is more narrow in the lateral direction than said extension.

9. A link according to claim 8 in which said extension means comprises an extension on each side of said second web means, said extensions being aligned in the lateral direction of said link.

10. A link according to claim 9 in which said second web means comprises a recess on each side of said extensions opening toward the road engaging side of said second web means.

11. A link according to claim 11 in which each recess is less than half the height of said second web means and extends longitudinally of the said second web means a distance not greater than the longitudinal extent of each said extension, the longitudinal end walls of each said recess diverging toward the road engaging side of said second web means.

12. A link according to claim 8 in which said second web means is generally rectangular in cross section with one side facing the road surface and the opposite side facing away from the road surface and forming one side of the opening in said link.

13. A link according to claim 12 in which said first web means has a lesser height than said second web means in the plane of said web means and at least a portion of said first web means in a direction perpendicular to said plane is substantially more narrower than said second web means.

14. A link according to claim 13 in which the said portion of said first web means is that portion thereof facing away from the tire engaging side thereof while the tire engaging side of said first web means is substantially the same width as said second web means in a direction perpendicular to said plane and is convex toward said tire.

* * * * *